(12) United States Patent
Bandy, IV et al.

(10) Patent No.: US 7,223,922 B2
(45) Date of Patent: May 29, 2007

(54) ESD DISSIPATIVE COATING ON CABLES

(75) Inventors: William Thomas Bandy, IV, Fremont, CA (US); Icko Eric Timothy Iben, Santa Clara, CA (US); Peter John Golcher, Los Gatos, CA (US); John Bradley Kriehn, San Jose, CA (US); Ho-Yiu Lam, Mountain View, CA (US); Jeffrey Serrell Snyder, Morgan Hill, CA (US); Larry LeeRoy Tretter, Tucson, AZ (US); George G. Zamora, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 10/902,653

(22) Filed: Jul. 28, 2004

(65) Prior Publication Data
US 2006/0023382 A1   Feb. 2, 2006

(51) Int. Cl.
*H05K 1/00*     (2006.01)
(52) U.S. Cl. .............................. 174/254; 174/102 SC; 361/212; 361/220; 360/323
(58) Field of Classification Search ................ 361/91, 361/91.1, 56, 111, 212, 220; 174/102 SC, 174/254; 360/323, 245.9
See application file for complete search history.

(56) References Cited

U.S. PATENT DOCUMENTS

| 5,425,995 | A | | 6/1995 | Unruh ......................... 428/461 |
|---|---|---|---|---|
| 5,885,351 | A | * | 3/1999 | Long et al. .................. 118/621 |
| 6,059,998 | A | | 5/2000 | Unruh et al. ................ 252/500 |
| 6,459,043 | B1 | | 10/2002 | Dodsworth .................. 174/254 |
| 6,487,048 | B1 | | 11/2002 | Dunn ........................ 360/245.9 |
| 6,487,058 | B1 | * | 11/2002 | Dykes ......................... 361/56 |
| 6,927,951 | B2 | * | 8/2005 | Huha et al. ................. 360/323 |
| 6,995,958 | B2 | * | 2/2006 | Zhu ............................ 360/323 |
| 2003/0122111 | A1 | | 7/2003 | Glatkowski .................. 252/500 |
| 2003/0211231 | A1 | | 11/2003 | Ibar ............................. 427/58 |
| 2004/0257729 | A1 | * | 12/2004 | Scheibner et al. ............ 361/56 |

* cited by examiner

*Primary Examiner*—Brian Sircus
*Assistant Examiner*—Terrence Willoughby
(74) *Attorney, Agent, or Firm*—Zilka-Kotab, PC

(57) ABSTRACT

A cable having an electrostatic discharge (ESD) dissipative coating. The cable includes a lead and an ESD dissipative coating operatively coupled to the lead. Other layers such as adhesives and insulating layers can be provided. The ESD dissipative coating can also function as the insulator for the lead.

16 Claims, 4 Drawing Sheets

ESD DISSIPATIVE COATING ON CABLES

FIELD OF THE INVENTION

The present invention relates to a device for protection from electrostatic discharge and electrical overstress, and more particularly, this invention relates to an electrostatic discharge (ESD) conductive coating for cables for protecting an electronic device from electrostatic discharge and electrical overstress.

BACKGROUND OF THE INVENTION

Magnetic head-based systems have been widely accepted in the computer industry as a cost-effective form of data storage. In a magnetic tape drive system, a magnetic tape containing a multiplicity of laterally positioned data tracks that extend along the length of the tape is drawn across a magnetic read/write transducer, referred to as a magnetic tape head. The magnetic tape heads can record and read data along the length of the magnetic tape surface as relative movement occurs between the heads and the tape.

In a magnetic disk drive system, a magnetic recording medium in the form of a disk rotates at high speed while a magnetic head "flies" slightly above the surface of the rotating disk. The magnetic disk is rotated by means of a spindle drive motor.

Magnetoresistive (MR) sensors are particularly useful as read elements in magnetic heads, used in the data storage industry for high data recording densities. Two examples of MR materials used in the storage industry are anisotropic magnetoresistive (AMR) and giant magnetoresistive (GMR). MR and GMR sensors are deposited as small and thin multi-layered sheet resistors on a structural substrate. The sheet resistors can be coupled to external devices by contact to metal pads which are electrically connected to the sheet resistors. MR sensors provide a high output signal which is not directly related to the head velocity as in the case of inductive read heads.

To achieve the high areal densities required by the data storage industry, the sensors are made with commensurately small dimensions. The smaller the dimensions, the more sensitive the thin sheet resistors become to damage from spurious current or voltage spike.

A major problem that is encountered during manufacturing, handling and use of MR sheet resistors as magnetic recording transducers is the buildup of electrostatic charges on the various elements of a head or other objects which come into contact with the sensors, particularly sensors of the thin film type, and the accompanying spurious discharge of the static electricity thus generated. Static charges may be externally produced and accumulate on instruments used by persons performing head manufacturing or testing function. These static charges may be discharged through the head causing excessive heating of the sensitive sensors which result in physical or magnetic damage to the sensors.

As described above, when a head is exposed to voltage or current inputs which are larger than that intended under normal operating conditions, the sensor and other parts of the head may be damaged. This sensitivity to electrical damage is particularly severe for MR read sensors because of their relatively small physical size. For example, an MR sensor used for high recording densities for magnetic tape media (on the order of 25 MBytes/cm$^2$) are patterned as resistive sheets of MR and accompanying materials, and will have a combined thickness for the sensor sheets on the order of 500 Angstroms (Å) with a width of about 10 microns (μm) and a height on the order of 1 μm. Sensors used in extant disk drives are even smaller. Discharge currents of tens of milliamps through such a small resistor can cause severe damage or complete destruction of the MR sensor. The nature of the damage which may be experienced by an MR sensor varies significantly, including complete destruction of the sensor via melting and evaporation, oxidation of materials at the air bearing surface (ABS), generation of shorts via electrical breakdown, and milder forms of magnetic or physical damage in which the head performance may be degraded. Short time current or voltage pulses which cause extensive physical damage to a sensor are termed electrostatic discharge (ESD) pulses. Short time pulses which do not result in noticeable physical damage (resistance changes), but which alter the magnetic response or stability of the sensors due to excessive heating are termed electrical overstress (EOS) pulses.

While a disk head is comprised of a single MR element, modern tape heads have multiple MR elements, on the order of 8 to 32, or even more, all of which must be fully functional. The large number of MR sensors in a tape drive and the requirement that all are functional, makes ESD loss due to a single element very expensive as the entire head must then be scrapped. Testing during manufacturing is important in order to eliminate damaged components early in the process to minimize cost by avoiding processing of damaged parts.

Prior art FIG. 1 illustrates a tape head in use. As shown, FIG. 1 illustrates a completed head for a read-while-write bidirectional linear tape drive. "Read-while-write" means that the read element follows behind the write element. This arrangement allows the data just written by the write element to be immediately checked for accuracy and true recording by the trailing read element. Specifically, in FIG. 1, a tape head 100 comprising two modules 105 are mounted on a ceramic substrate 102 which are, in turn, adhesively or otherwise physically coupled. Each of the modules 105 includes several read sensors and/or write transducers electrically coupled to pads (not shown) for subsequent attachment to external electronic devices. Closures 104 are coupled to the modules 105 to support the tape and protect the read/write elements from wear by the tape. Conductive wires in cables 106 are fixedly and electrically coupled to the pads. The tape 108 wraps over the modules 105 at a predetermined wrap angle α.

Prior art FIG. 2 illustrates a tape module 105 formed with read and write elements 110, 112 exposed on a tape bearing surface 114 of the module 105.

Cables used in disk and tape drive systems are predominantly made using an electrically insulating dielectric material as a substrate on which leads are attached. The insulative substrate encapsulates the conductive metal leads to avoid possible contact of the metal leads with other metal objects. Polyimides, such as KAPTON® made by DuPont, P.O. Box 89, Circleville, Ohio 43113, are a common choice of insulating substrate material used in the flexible cable industry. Polyimides are very susceptible to localized charge buildup through tribocharging mechanisms, and the time for the charge to dissipate is very long. The charge on the cable surface can then capacitively couple into the metal leads of the cable, which are in contact with the MR sensor. FIG. 3 is a partial representative cross sectional view of a cable 300 constructed of a metal lead 302 and a poyimide overcoat 304. As shown, a localized charge is generated on the outer surface of the polyamide overcoat 304 and a negative charge forms on the surface of the metal 302 to balance out the positive surface charge. A uniform charge distribution is also typically present in the metal. The balancing surface charge on the metal nullifies the electrical field in the metal lead. The charge in and on the metal is typically electrically isolated from external charge sinks and therefore does not migrate or dissipate. However, if the metal touches a ground, the charge can flow through the delicate MR sensor and cause ESD or EOS damage.

The problem is compounded by the fact that the time for the charge to dissipate into the air is very long. FIG. 4 is a chart showing voltage discharge vs. time for KAPTON/PYRALUX LF7001 (DuPont). The KAPTON was charged by rubbing a dry chem-wipe (Kimberly-Clark) across the surface. The KAPTON was ~2.5 cm from the non-contact probe. As shown, the decay period is very long.

A conductive cable could be used to spread the charge out, but even traditionally ESD dissipative conductives can interfere with the performance of the MR sensor by coupling one sensor to another, or a reader to a writer. A metal coating on the surface of the cable might also spread the charge out, but could result in excessive electromagnetic interference (EMI) radiation.

Other prior solutions to ESD and EOS protection can be summarized into two types of approaches: 1) by using diode(s) and 2) by shorting out the sensor element. Both of these approaches have significant disadvantages. Electrically shorting out the MR sensors, by shorting the two ends of the sensor which connect to external devices, provides the best possible ESD protection. The problem with this technique is that the head is no longer functional while the short is applied. Once the short is removed, for testing or use, the sensors are no longer protected. Furthermore, with a removable short, the action of removing the short could also cause tribocharging of the cable which could potentially damage the sensors.

In the diode approach, the diode is intended to remain in parallel with the sensor element during normal operation of the disk (or tape) drive. Potential problems which the diode approach are: 1) drainage of current under normal operation degrading the sensor performance, 2) excessive weight of the diode package affecting mechanical motion of the tape head, 3) excessive cost of adding a multiplicity of diodes, 4) physically being able to fit a multiplicity of diodes onto a cable, and 5) space constraints within a small tape drive.

For example, one method used in the hard disk drive industry is to use diode package containing a pair of crossed diodes connected across the MR element to protect the MR device. This has not been implemented in tape drives due to cost issues. Particularly, since modern tape heads have multiple read elements, it can be expensive to add packages containing individual diodes or pairs of diodes for each element, particularly when the head and cable are scrapped during the testing phase. While mounting diodes on a single slider may be cost effective, the sheer number of diodes required for a modern tape head can add significant cost to the head.

While diode protection used for disk drives uses a pair of crossed diodes, the voltages applied in to the MR elements in tape heads (e.g., >0.6 V) would cause a single diode to shunt too much current, resulting in degraded performance. Furthermore, the added weight of many diodes or chips on the cable will affect the dynamics of the head actuation, potentially degrading its track following performance. Another constraint is the physical space within an extant tape drive requires extremely small components. Furthermore, the discharge time is very short (e.g., ~0.1 to 10 ns) when a charged lead comes in contact with a metal object such as a test device or a drive. Diodes may not be able to respond during this time frame. Thus the ESD dissipative coating can be used in conjunction with diode protection to even further protect the sensors from different sources of potentially damaging charges.

A need therefore exists for providing ESD and EOS protection for a multiplicity of read and/or write head assemblies which has a low cost, is small enough not to affect the dynamics of the head during operation, which fits into the tight spaces within a tape or disk drive, and which allows for the higher voltages used in normal tape drive operation.

SUMMARY OF THE INVENTION

The present invention provides a mechanism for protecting an electronic component from ESD/EOS damage. Particularly, a cable having an electrostatic discharge (ESD) dissipative coating is provided. The cable includes a lead and an ESD dissipative coating operatively coupled to the lead. Other layers such as adhesives and insulating layers can be provided. The ESD dissipative coating can also function as the insulator for the lead.

In one embodiment, the ESD dissipative coating has an ESD dissipative surface resistance of from about $1 \times 10^6$ to about $1 \times 10^8$ ohm/sq. In another embodiment, the ESD dissipative coating has an ESD dissipative surface resistance of from about $0.5 \times 10^7$ to about $1.5 \times 10^7$ ohm/sq. In yet another embodiment, the ESD dissipative coating has an ESD dissipative surface resistance of about $1 \times 10^7$ ohm/sq.

The ESD dissipative coating can be applied by spraying, by an applicator, and/or as a layer of polymeric material. In the latter, the polymeric material can include conductive materials interspersed therein.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The present description discloses cables having an ESD dissipative portion for protecting delicate components of an electronic device from ESD and EOS damage. Although the invention is described as embodied for use with a magnetic tape storage system, the invention also applies to other electronic devices, including magnetic recording systems and applications using a sensor to detect a magnetic field.

Cables used in the storage industry for use with MR devices traditionally have electrical leads which are encapsulated in a polyimide or other electrically insulating material (e.g., KAPTON). Traditionally, the surface coating of such cables has been electrically insulating, and are susceptible to charge buildup.

Figure 1:
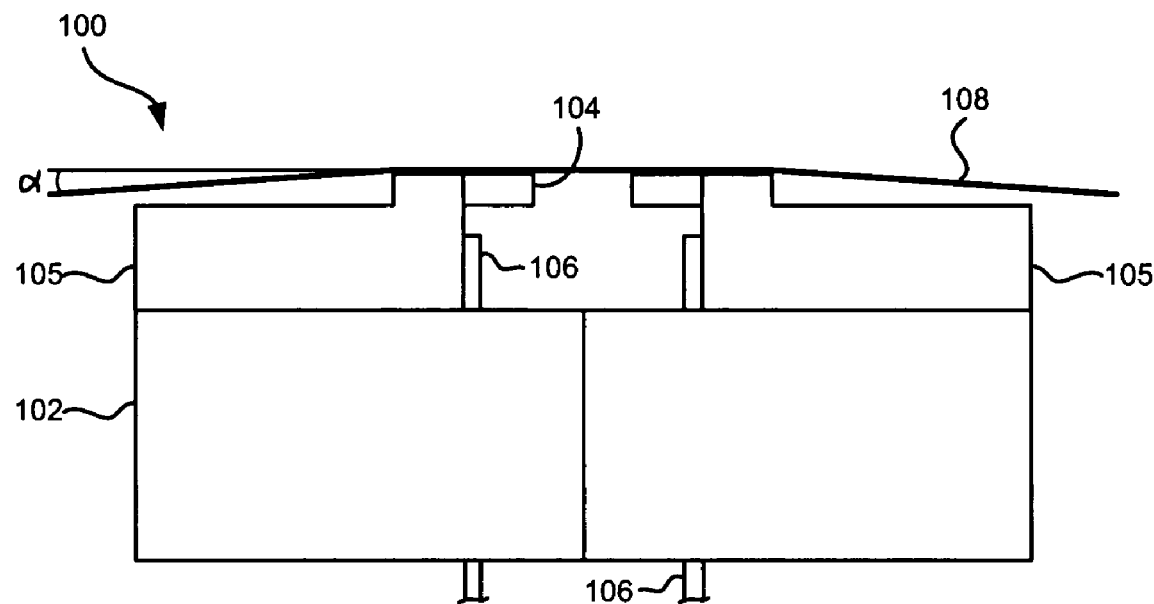
FIG. 1 is a partial side view of a tape head in use.
Figure 3:
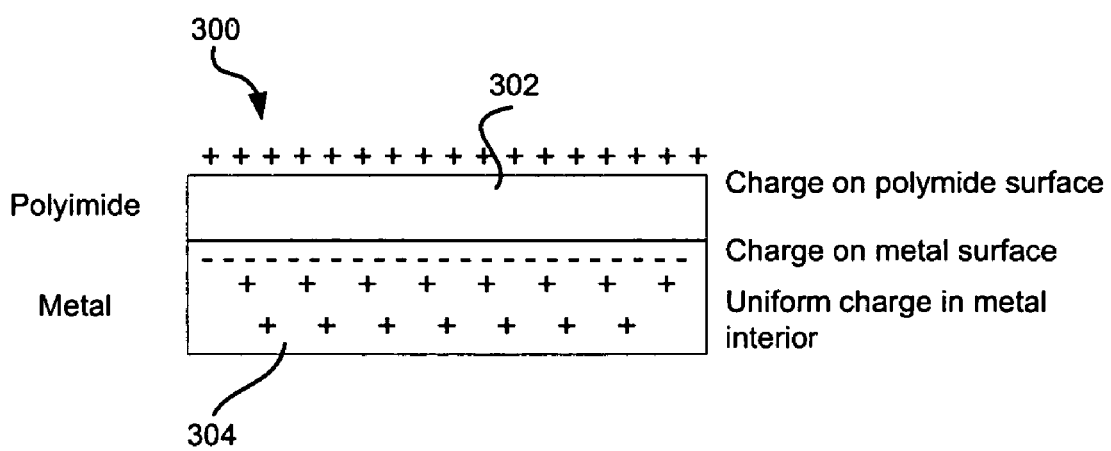
FIG. 3 is a partial representative cross sectional view of a cable constructed of a metal lead and a polyimide overcoat.
Figure 2:
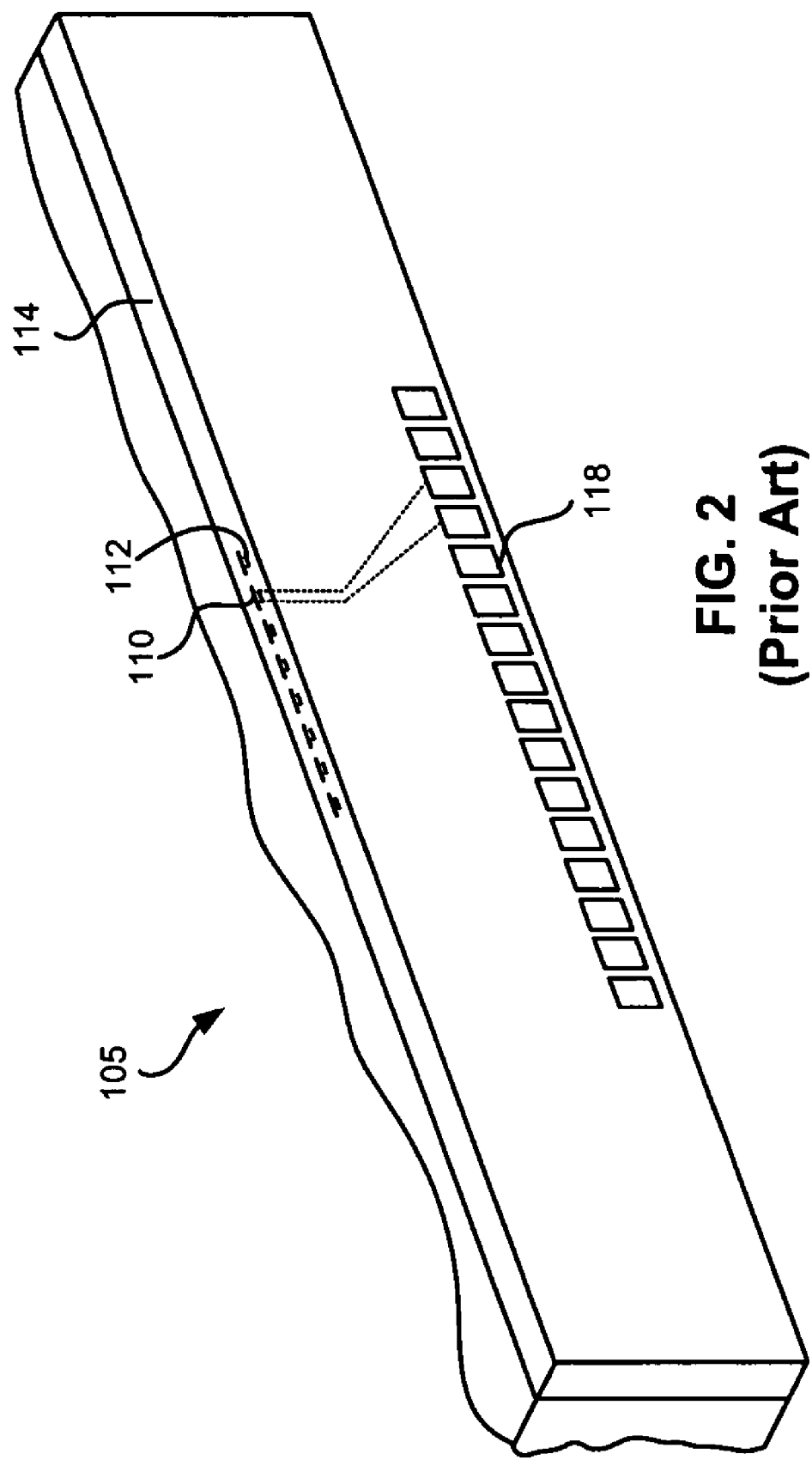
FIG. 2 is a partial perspective view of a tape head.
Figure 4:
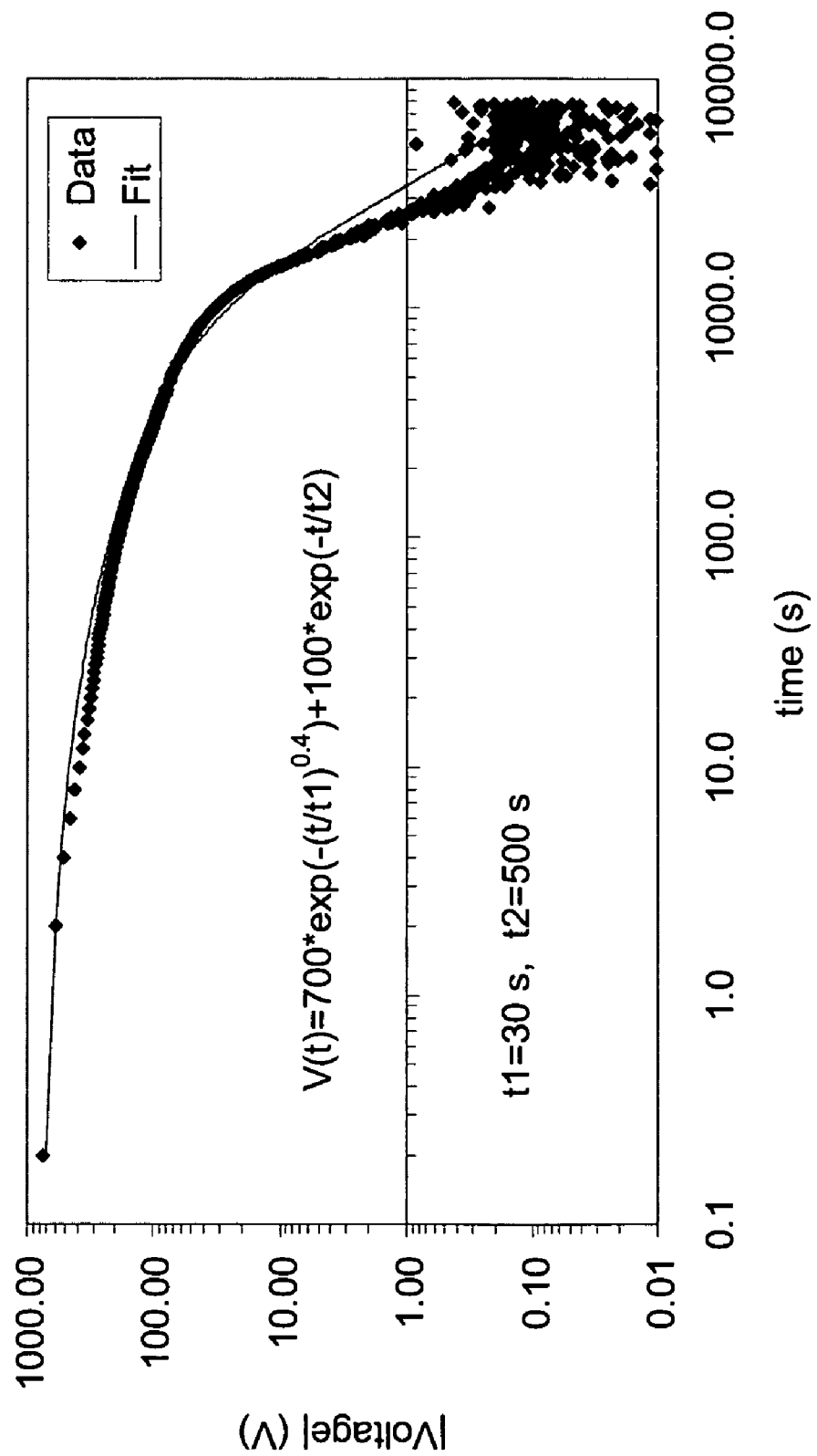
FIG. 4 is a chart showing voltage discharge vs. time for KAPTON®/PYRALUX LF7001 (DuPont).
Figure 5:
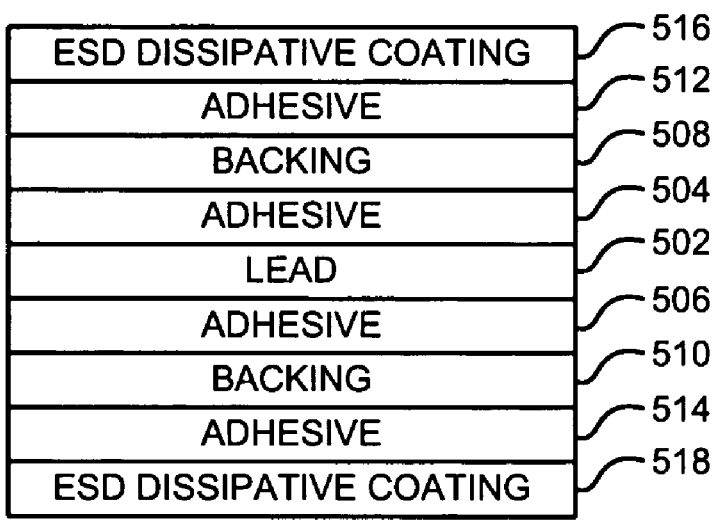
FIG. 5 is a simplified partial cross sectional view, not to scale, of a cable having ESD dissipative layers.

According to the present invention, the outer surface of the cable is made to be ESD conductive, preferably having an ESD dissipative surface resistance in the range of about $1 \times 10^6$ to $1 \times 10^8$ ohms per square, more preferably about $0.5 \times 10^7$ to about $1.5 \times 10^7$ ohm/sq, and ideally about $1 \times 10^7$ ohms/sq. The bulk of the cable material can be any desired material including metal, resistive material (e.g., KAPTON), adhesives, liquid crystal, etc. For example, FIG. 5 illustrates a cross section of a cable 500 having a lead 502 of a metal or other conductive material, inner adhesive layers 504, 506 skirting the lead 502, backing layers 508, 510 coupled to the inner adhesive layers 504, 506, outer adhesive layers 512, 514 skirting the backing layers 508, 510, and ESD dissipative layers 516, 518 coupled to the outer adhesive layers 512, 514. Note that layers can be added or removed per the desires of the user.

An ESD conductive surface on the cable in the disclosed range of conductivity will not result in EMI, and will not noticeably electrically couple any two elements in the same cable together.

In one embodiment, an ESD dissipative coating layer is applied to one or more of the outer surfaces of a standard cable. Again, the bulk of the cable material can be any desired material. The ESD dissipative coating is sprayed, painted on with an applicator, or otherwise applied to the cable in liquid or gel form in a thin layer by any suitable mechanism. In this cable, the outer adhesive layers (512 and 514) in FIG. 5 may not be necessary. The thickness of the layer of ESD dissipative material should be sufficient to provide an ESD dissipative surface resistance in the range of about $1 \times 10^6$ to $1 \times 10^8$ ohms/sq. One preferred surface material is SPEC-STAT® ESD CLEAR #618-1-220 available from Lasco Services, 601 Compton, Irving, Tex. 75061. Another is SPEC-STAT® ESD CLEAR #618-1-200 from Lasco Services. Experimentation has shown that when a cable coated with SPEC-STAT® ESD CLEAR #618-1-220 is rubbed with a nitrile glove ten times, the cable does not display any significant surface charge (<10V versus >1000V if KAPTON is rubbed).

One method for applying an ESD dissipative material such as SPEC-STAT® ESD CLEAR to a cable includes the following steps. Ensure that the cable to be painted is free of dirt, grease, oils and is dry. Position the cable about 10 to 12 inches from the spray nozzle. Spray with light sweeping action. Allow to dry so that it is not tacky to the touch. Apply a second coat. To accelerate drying, heated air can be blown against the cable after each application. Note that during application, it may be desirable to mask exposed leads of the cable that will eventually be electrically coupled to a sensor or other devices.

In another embodiment, an ESD dissipative layer is bonded onto one or more of the surfaces of the cable. Particularly, a thin ESD dissipative polymer coating can be bonded to the surfaces of the cable. A preferred surface material is a thin polymer which has conductive materials interspersed to make the polymer sheet resistance in the range set forth above. One such material is KAPTON® XC polyimide film sold by DuPont. DuPont KAPTON® XC polyimide films are electrically conductive films, which are precisely loaded with conductive carbons to produce films with tightly controlled surface resistivities. The resistive property is throughout the bulk of the film, so it cannot be cracked, rubbed off or otherwise easily damaged, as is often the case with surface coatings or metalizations. In addition to anti-static properties, KAPTON® XC film provides inertness, radiation and temperature resistance similar to that of other KAPTON® films such as those typically used to construct cables. Experimentation has shown that when a cable coated with KAPTON® XC film is rubbed with a nitrile glove ten times, the cable does not display any significant surface charge (<10V versus >1000V if standard KAPTON material is rubbed).

KAPTON® 100XC10E7 is a one mil film with a nominal surface resistivity of $10^7$ ohm/sq. Custom constructions are also available from DuPont, and can be produced in thickness from 1 to 5 mil, and with surface resistances from 20 to $10^9$ ohms/sq. KAPTON® 100XC10E7 film is supplied in rolls.

The ESD dissipative coating can be bonded to the cable by any suitable mechanism, including application of an appropriate adhesive such as heat-activated PYRALUX® sold by DuPont. Alternatively, the ESD dissipative coating can have an, adhesive backing already formed thereon.

Figure 6:
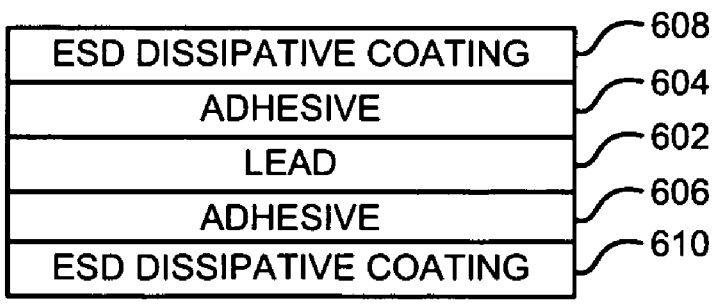
FIG. 6 is a simplified partial cross sectional view, not to scale, of a cable having ESD dissipative layers that act both as the cable substrate and lead insulators.

In a further embodiment, an ESD dissipative coating is used as the insulator for the cable. Preferably, the ESD dissipative coating will have an electrical resistivity that is sufficient to prevent shorting of the conductors and leads in the cable, as well as not significantly interfere with the signal being sent through the cable. FIG. 6 illustrates a cross section of a cable 600 having a lead 602 of a metal or other conductive material, adhesive layers 604, 606 skirting the lead 602, and ESD dissipative layers 608, 610 coupled to the adhesive layers 604, 606. Note that additional layers can also be present.

Table 1 lists results of experiments measuring the tribocharging potential of various sheet materials. In the "rubbed with nitrile gloves" experiments, a clean sheet of the material was rubbed with nitrile gloves ten times with one inch strokes. In the "peeling off from paper" experiments, a paper backing was peeled off of the material.

TABLE 1

| Material | Rubbed with Nitrile glove Voltage (Volts) | Peeling off from paper Voltage (Volts) |
|---|---|---|
| Kapton XC 10^7 ohm/sq | Insignificant | Insignificant |
| Kapton CPB 10^12 ohm/sq | 50–400 | >3000 |
| LCP 3600 F02053 | 200–3000 | >3000 |
| Kapton/Pyralux, LF7001 Dupont | >1000 | >3000 |
| LCP 3800 | >1500 | >3000 |
| LCP 212141 | >1000 | >3000 |

Expanding on the results shown in Table 1, rubbing a cable (KAPTON CBP (polyimide) cleaned with isopropyl alcohol) with nitrile gloves charges the cable to over 250±100V.

Rubbing a clean sheet (Kapton LF7001 (polyimide)) with a finger or nitrile gloves charges the cable to over 1600V. Charge dissipation times are: 11, 102 and 450 seconds for 75%, 50%, 90% dissipation, respectively. The external voltage from the charged surface is dramatically shielded when the KAPTON sheet is placed over a metal (aluminum foil) but the external voltage "reappears" when the metal sheet is removed, indicating that the metal sheet insulated the charges on the KAPTON from external detection without removing the charges, thus hiding the potentially damaging charges from detection. The voltage with height drops by ~3.4% per mm.

Rubbing a clean cable (Kapton XC (polyimide with a small percentage of conductive graphite, $10^7$ Ω/sq)) with nitrile gloves results in no noticeable tribocharging, even when holding with an insulator.

The cables thus described with an ESD dissipative coating are effectively immune to charge build up and thus eliminate this mechanism as a source of ESD or EOS damage. The cables described herein are suitable for use with any device or electronic component for which ESD or EOS protection is desired. The cables are especially useful when coupled to MR sensors in magnetic storage devices such as tape drives and disk drives.

Further, the preferred methods thus described do not affect the cable mechanical properties such as bending stiffness or weight, making them preferable to other ESD and EOS prevention devices whose weight can interfere with actuation of the tape or disk heads.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A cable having an electrostatic discharge (ESD) dissipative coating, comprising:
    an elongate lead having a length defined therealong between distal ends thereof; and
    an ESD dissipative coating operatively coupled to the lead and extending along a majority of the length of the lead,
    wherein the ESD dissipative coating also functions as an electrical insulator for the lead, wherein no other insulator excluding an adhesive is present.

2. A cable as recited in claim 1, wherein the ESD dissipative coating has an ESD dissipative surface resistance of from about $1 \times 10^6$ to about $1 \times 10^8$ ohm/sq.

3. A cable as recited in claim 1, wherein the ESD dissipative coating has an ESD dissipative surface resistance of from about $0.5 \times 10^7$ to about $1.5 \times 10^7$ ohm/sq.

4. A cable as recited in claim 1, wherein the ESD dissipative coating has an ESD dissipative surface resistance of about $1 \times 10^7$ ohm/sq.

5. A cable as recited n claim 1, further comprising an adhesive operatively coupling the ESD dissipative coating to the lead, the ESD dissipative coating forming a majority of an outer surface of the cable.

6. A cable as recited in claim 1, further comprising an insulating layer positioned between the lead and the ESD dissipative coating.

7. A cable as recited in claim 1, wherein the ESD dissipative coating is applied by spraying.

8. A cable as recited in claim 1, wherein the ESD dissipative coating is applied by an applicator.

9. A cable as recited in claim 1, wherein the ESD dissipative coating is a layer of polymeric material.

10. A cable as recited in claim 9, wherein the polymeric material includes conductive materials interspersed therein.

11. A cable having an electrostatic discharge (ESD) dissipative coating, the cable comprising:
    a lead; and
    an ESD dissipative coating operatively coupled to the lead, the ESD dissipative coating forming a majority of an outer surface of the cable;
    wherein the ESD dissipative coating has an ESD dissipative surface resistance of from about $1 \times 10^6$ to about $1 \times 10^8$ ohm/sq,
    wherein the ESD dissipative coating also function as an electrical insulator for the lead, wherein no other insulator excluding an adhesive is present.

12. A cable as recited in claim 11, wherein the ESD dissipative coating has an ESD dissipative surface resistance of from about $0.5 \times 10^7$ to about $1.5 \times 10^7$ ohm/sq.

13. A cable as recited in claim 11, wherein the ESD dissipative coating has an ESD dissipative surface resistance of about $1 \times 10^7$ ohm/sq.

14. A cable as recited in claim 11, further comprising insulating layers positioned between the lead and the ESD dissipative coating.

15. A cable as recited in claim 11, wherein the ESD dissipative coating is applied in liquid form.

16. A cable as recited in claim 11, wherein the ESD dissipative coating is a layer of polymeric material.

* * * * *